Sept. 18, 1962  E. W. SEILER  3,054,467
ROLL SUPPORTED VEHICLE FOR IRREGULAR TERRAIN
Filed April 6, 1959  2 Sheets-Sheet 1
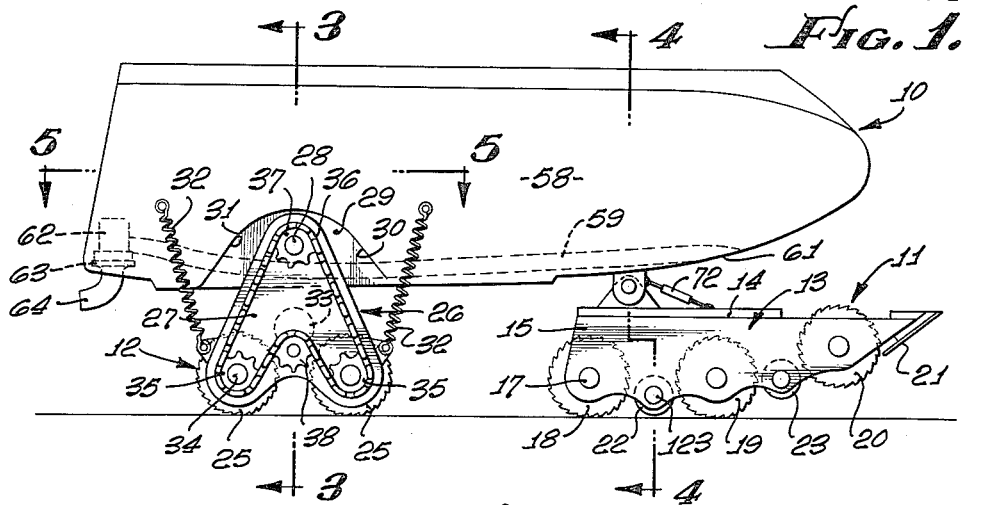
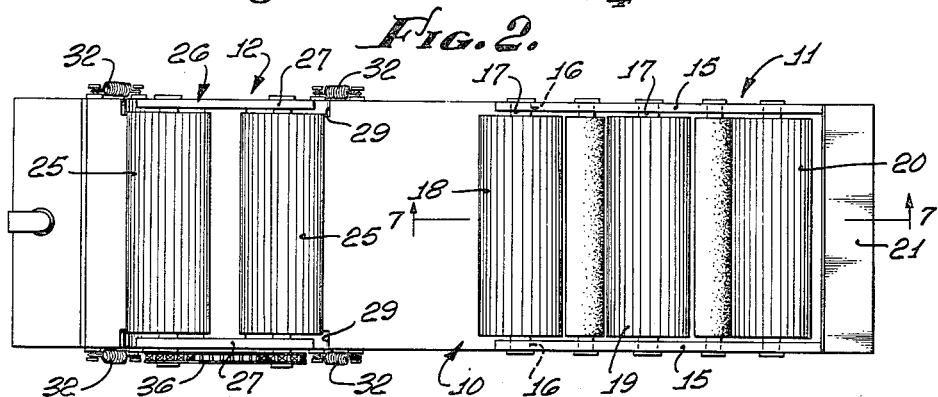
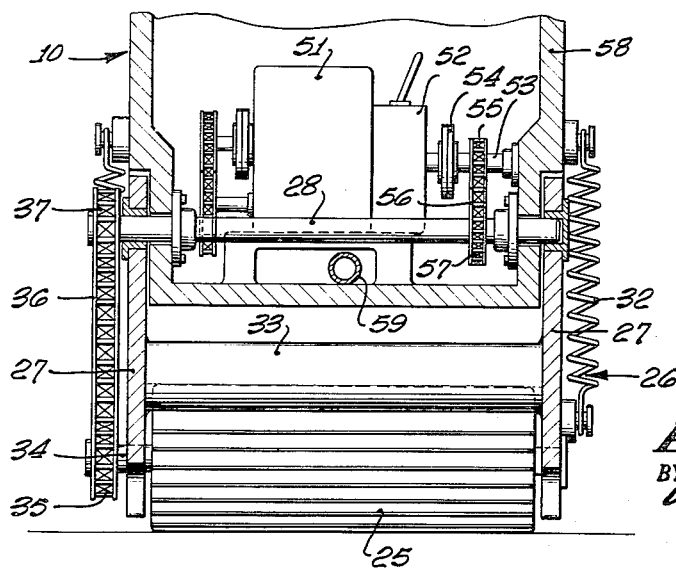
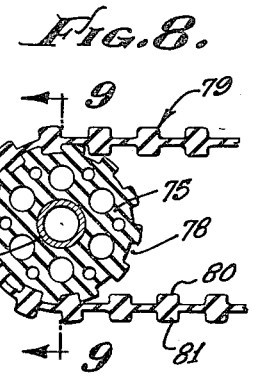
INVENTOR.
EDWIN W. SEILER
BY
ATTORNEYS.

Sept. 18, 1962      E. W. SEILER      3,054,467
ROLL SUPPORTED VEHICLE FOR IRREGULAR TERRAIN
Filed April 6, 1959      2 Sheets-Sheet 2
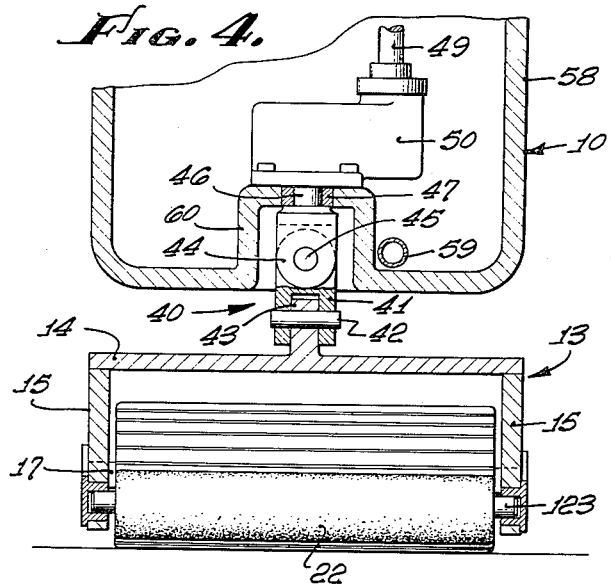
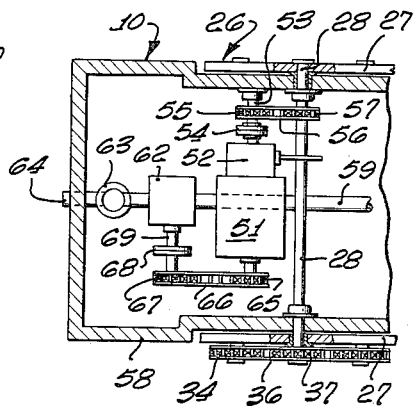
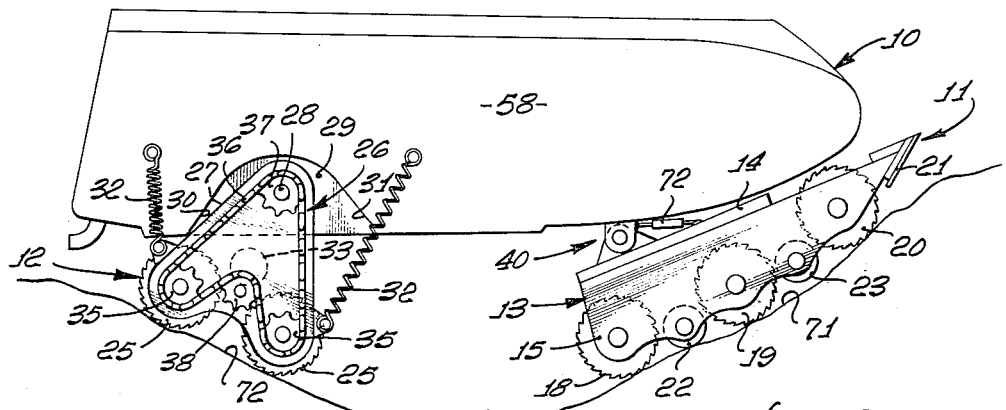
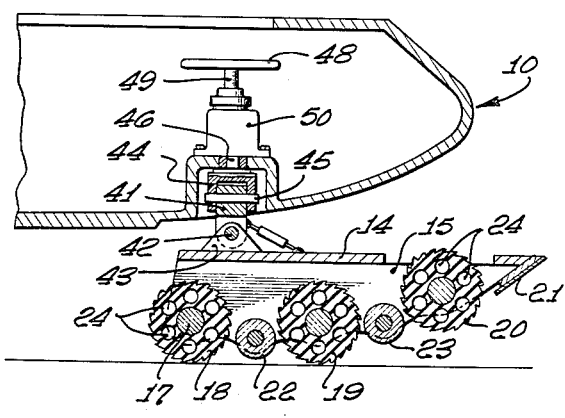
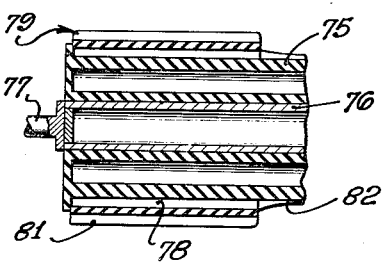
INVENTOR.
EDWIN W. SEILER
BY *White and Haefliger*
ATTORNEYS

United States Patent Office 3,054,467
Patented Sept. 18, 1962

3,054,467
ROLL SUPPORTED VEHICLE FOR
IRREGULAR TERRAIN
Edwin W. Seiler, 3rd Judicial District,
King Salmon, Alaska
Filed Apr. 6, 1959, Ser. No. 804,253
4 Claims. (Cl. 180—20)

This invention has to do generally with improvements in vehicles adapted for travel over exceptional terrains, and is directed particularly to various novel features whereby it is made possible and practical to adapt vehicles for difficult ground travel, or for both ground and water use, to better advantage than any prior vehicles of which I am aware.

The invention has been occasioned by recognition of the necessity for better travel or transportation facilities over difficult terrains such as are created by deep snow, ice formations and tundra, for example of the kind encountered in Alaskan and other northern regions, where transportation in many regions is still largely confined to dog sleds and their obvious limitations, in the absence of other practicable and better means.

My general object is to provide a vehicle of new type and construction characterized primarily by the novel form, arrangement and mounting of its ground traveling components, and by its possible though not necessary utility, for water as well as land travel.

In contemplation of its functions and operability for ground travel over terrains of the character indicated, the invention is predicated upon the concept of providing the vehicle with ground bearing means presenting individually and collectively, bearing areas sufficiently great to support the vehicle load without excessive sinking into soft media, and so arranged as to assure to this end, extended distribution of the load both longitudinally and laterally of the vehicle. Also contemplated are mountings whereby such ground bearing means are given the capacity for movement and displacement in accordance with the ground irregularities encountered, as to enable the vehicle to accommodate itself to advance over terrains which are soft, rough or both soft and irregular.

As ground bearing components I employ, preferably both fore and aft of the vehicle, transverse rolls extending what may be termed the full tread (ground engaging) width of the vehicle, and arranged in forward and rear assemblies providing respectively for front body support and steering, and rear body support and powered drive. As will appear, the unique mountings and arrangements given the forward and rear roll assemblies, enable them to serve their steering and driving functions and yet be displaceable in relation to ground irregularities encountered.

Among its more specific objects, the invention contemplates a novel front end assembly of a steerable frame carrying or connected to the rolls, and mounted for universal movement relative to the body so that the frame and rolls are inclinable both longitudinally and laterally of the body. And as will appear the front assembly rolls are so relatively positioned as to enable the vehicle to ride over or into ground irregularities while maintaining this universality for bodily displacement. The rear assembly provides an arrangement which preferably also permits bodily displacement of its rolls longitudinally of the body while maintaining constant drive. For this purpose I employ a rear roller carrying frame mounted for swinging movement forward and aft of the body, and power connection with the vehicle engine whereby one or all of the rolls may be driven.

Where the vehicle is adapted for water travel the body may be formed in the nature of a boat hull, and provided for propulsion means that can be driven by the same motor used to drive the rolls. Considering the ground travel characteristics of the vehicle, it is preferred that in water, the vehicle be water-jet propelled.

All the above features and objects of the invention as well as the details of an illustrative embodiment, will be understood more fully from the following detailed description of the accompanying drawings, in which:

FIG. 1 is a view showing the vehicle in side elevation;
FIG. 2 is a bottom plan of FIG. 1;
FIGS. 3 and 4 are fragmentary enlarged sections taken respectively on lines 3—3 and 4—4 of FIG. 1;
FIG. 5 is a fragmentary section, diagrammatic in character, taken on lines 5—5 of FIG. 1;
FIG. 6 is a view similar to FIG. 1 showing the vehicle travelling over irregular terrain;
FIG. 7 is a fragmentary section taken on line 7—7 of FIG. 2;
FIG. 8 is a fragmentary sectional view illustrating a variational contemplation in the adaptation of the rolls to receive a removable endless track; and
FIG. 9 is a fragmentary section on line 9—9 of FIG. 8.

Referring first to the general showing of FIG. 1, the vehicle is shown to comprise a body 10 resembling in form and construction a boat hull rendering the vehicle capable of travel in water as well as on land. The body is carried by a forward steerable roll assembly generally indicated at 11, and by a rear roll assembly 12 powered to drive the vehicle as later explained.

The forward assembly 11 comprises a suitable frame structure 13 which may have any suitable construction, but is shown for purposes of illustration to comprise a top plate 14 and depending sides 15 within which are journaled as at 16, the shaft 17 of rolls 18, 19 and 20. These rolls are arranged in a generally horizontal series with two or more rolls like 18 and 19 at the same elevation for simultaneous travel on level ground, and a forward roll 20 elevated in relation to 18 and 19 for the over-riding of irregularities encountered as the vehicle advances. Thus the frame 13 may be generally sled-shaped and the rolls positioned accordingly. The capacity of the front assembly to over-ride obstructions may be further enhanced by giving the frame an upward and angular extent at 21 in advance of the roll 20. I preferably provide between the rolls suitable barrier means to prevent or obstruct the entry of ground objects between the rolls that would tend to block or interfere with their rotation. Such blocking means may comprise smaller diameter rolls 22 and 23, rotatably or non-rotatably carried by shafts 123 terminating in the frame sides 15, the bottom of roll 23 being below the axis of roll 23.

It is desirable that the rolls be given substantial yieldability in order to increase appreciably their areas of ground contact and to cushion the impact of the rolls with such ground objects as they may encounter. For these purposes the bodies of the rolls may be made of rubber containing circular distributed openings 24 extending substantially the length of the roll, the openings being closed at their ends by rubber facings on the ends of the roll. Thus all the rolls, including those of the rear assembly 12 present in the aggregate, a large ground surface bearing area distributed both longitudinally and transversely of the vehicle across its entire tread width, to the end of reducing the unit area load to a degree permitting the vehicle to travel on snow or soft terrain.

The rear assembly 12 is shown to comprise a plurality, particularly two, of ground bearing rolls 25 like those previously described carried by a frame 26 having generally triangular side plates 27 mounted for oscillation about shaft 28 within the body recesses 29, between positions limited by engagement of the side plates against the recessed shoulders at 30 and 31. Oscillation of the frame relative to the body may be yieldably resisted, as for example by coil springs 32 interconnecting the frame sides with the body. A transverse member or tube 33 serves to interconnect and rigidify the side plates 27 into a unitary swinging frame assembly. Rolls 25 are carried by shafts 34 journaled within the plates 27 and carrying at the outsides thereof sprockets 35 which are driven by chain 36 extending about sprocket 37 on the shaft 28 to be driven by the later described motor. The chain may be maintained properly elevated away from proximity to the ground between the rolls by passing over an idler and tension-adjusting sprocket 38.

Referring now particularly to FIGS. 4 and 7, the forward frame 13 is shown to be connected to the underside of the body 10 by a universal mounting typified by the joint structure at 40, whereby the front assembly 11 is given the capacity for inclination relative to and both longitudinally and transversely of the body. Merely as illustrative the joint at 40 is shown to comprise a bifurcated section 41 connected by pivot 42 to lug 43 integral with the frame plate 14, and a second bifurcated section 44 connected to section 41 by pin 45 and having a stub shaft or trunnion 46 extending upwardly through watertight bearing 47 in the bottom of the body. The frame 13 is horizontally rotatable to steer the vehicle by wheel 48, the shaft 49 of which reversibly drives shaft 46 through appropriate gear box 50.

As illustrated in FIGS. 3 and 5, the hull contains an engine or a motor 51 which drives through transmission 52 a shaft 53 containing clutch 54 and carrying sprocket 55 which by way of chain 56 drives sprocket 57 on the shaft 28. At this point it may be mentioned that shaft 28 may carry sprockets 37 and the roller chain drive previously described with reference to FIG. 1, at either or both sides of the vehicle. Clutch 54 may be actuated to engage or disengage the drive from the motor to shaft 28.

As previously indicated, where the body 10 of the vehicle may be constructed essentially as a boat hull rendering the vehicle capable of travel in water, I provide suitable propulsion means, preferably of a water-jet type. As illustrative, the hull 58 may contain an internal duct 59 which may be curved about the recessed wall 60 of the hull appearing in FIG. 4, the forward end of the duct being opened at 61 and the rear of the duct connected to a pump 62. The pump 62 has a swivel connection at 63 with a curved outlet 64 oriented to discharge a water jet capable of propelling the vehicle in water, and also of steering the hull by reason of the capacity for swinging movement given the outlet tube by its swivel connection 63. To drive the floated vehicle forwardly, water is taken in through duct 59 to the pump and discharged at adequately high jetting velocity through the outlet 64. By rendering the pump reversible, water may be jetted reversely through the duct and out at 61 to propel the hull in reverse.

Pump 62 may be driven from the motor shaft sprocket 65 by way of chain 66 and sprocket 67 and clutch 68 carried by the pump shaft 69.

Clutches 54 and 68 may be used to selectively drive the rear roll assembly 26 or the pump 62, or both. Thus when the vehicle is travelling on land, the pump will be out of operation, and when in deep water only the pump will be operating. However in shallow water or when the vehicle is landing from the water, both the pump and rear drive roller assemblies may be in operation.

FIG. 6 is illustrative of one condition of land travel where the front and rear assemblies 11 and 12 deflect in response to the contour of ground irregularities. Here as the vehicle traverses a ground impression 70 the front assembly 11 traveling up the inclination 71 tends to deflect upwardly in conforming to the contour. At this point it may be mentioned that suitable shock absorber means, illustrated conventionally at 72, may be used to cushion swinging movements of the forward frame relative to the body. The rear assembly 12 traversing the inclination 72 may tend to swing rearwardly, more or less to the extent indicated, thereafter to be restored on level ground to centered position by the action of springs 32.

Referring to the variational aspect of the invention illustrated in FIGS. 8 and 9, any adjacent pairs of the rolls in either or both the front and rear roll assemblies 11 and 12, may be adapted to carry removable tracks, made for example of nylon reinforced rubber, for use on soft snow. Here each roll of any adjacent pair is shown, as before, to have a rubber body 75 carried on a tubular shaft 76 equipped with end trunnions 77, the surface of the roll adjacent its end containing recesses 78 giving to the roll surface an essentially toothed configuration. These roll surfaces themselves are well suited for effective ground traction in the absence of the applied tracks.

When the vehicle is to be used on soft snow, endless tracks 79 may be applied to the toothed end surfaces of the roll, each track being of flexible endless form and carrying combined ribs 80 for reception within recesses 78, and exterior ribs 81. As illustrated in FIG. 9, the surface of the roll may be curved inwardly at 82 between the traction-carrying end extents.

I claim:
1. A vehicle comprising a body, front and rear assemblies each comprising a plurality of ground traveling rolls extending transversely of the vehicle the tread width thereof below the body, a motor, driving means connecting said motor and a roll in the rear assembly to motivate the vehicle, said front assembly comprising a forward frame below the body and within which a plurality of rolls are rotatable, and steering means connecting said frame to the body for universal tilting and horizontal swinging movements relative thereto, said steering means comprising a manually rotatable steering shaft including a universal joint structure operable to transmit the shaft rotation to the frame, said joint structure including parts relatively movable to allow universal tilting of the frame in accordance with the ground contour, said rear assembly comprising a pair of transverse driving rolls, means mounting said driving rolls for bodily swinging movement longitudinally of the vehicle, and a driving connection between said motor and the driving rolls.

2. A vehicle according to claim 1, comprising also yielding means resisting said swinging movement of the rear rolls.

3. A vehicle according to claim 1, in which said mounting means for the driving rolls, comprises a frame structure pivotally connected to the underside of the body, and within which the driving rolls are rotatable.

4. A vehicle according to claim 3, in which said driving connection comprises a sprocket driven by the motor, sprockets carried by the driven rolls, and an endless chain about said sprockets.

References Cited in the file of this patent

UNITED STATES PATENTS

| | | |
|---|---|---|
| 714,762 | Townsend | Dec. 2, 1902 |
| 1,345,109 | Seeley | June 29, 1920 |
| 2,072,611 | Von Kories | Mar. 2, 1937 |
| 2,406,290 | Hait | Aug. 20, 1946 |
| 2,755,713 | Harrison | July 24, 1956 |
| 2,878,883 | France et al. | Mar. 24, 1959 |

FOREIGN PATENTS

| | | |
|---|---|---|
| 910,372 | France | Jan. 28, 1946 |
| 545,858 | Italy | July 6, 1956 |